United States Patent
Lee et al.

(10) Patent No.: US 8,804,632 B2
(45) Date of Patent: *Aug. 12, 2014

(54) METHOD OF PERFORMING RANDOM ACCESS PROCEDURE IN MULTIPLE COMPONENT CARRIER SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 512 days.

This patent is subject to a terminal disclaimer.

(21) Appl. No.: 12/915,465

(22) Filed: Oct. 29, 2010

(65) Prior Publication Data

US 2011/0103328 A1 May 5, 2011

Related U.S. Application Data

(60) Provisional application No. 61/256,878, filed on Oct. 30, 2009.

(51) Int. Cl.
H04W 72/04 (2009.01)
H04W 74/00 (2009.01)
H04W 74/08 (2009.01)

(52) U.S. Cl.
CPC ........ *H04W 74/004* (2013.01); *H04W 74/0833* (2013.01); *H04W 72/0413* (2013.01)
USPC .......................................................... 370/329

(58) Field of Classification Search
None
See application file for complete search history.

(56) References Cited

U.S. PATENT DOCUMENTS

2010/0296467 A1* 11/2010 Pelletier et al. ............... 370/329

* cited by examiner

*Primary Examiner* — Jae Y Lee
*Assistant Examiner* — Alan Lindenbaum
(74) *Attorney, Agent, or Firm* — Morgan, Lewis & Bockius LLP (57) ABSTRACT

A method of performing a random access procedure by a user equipment (UE) in a multiple-carrier system is provided. The method includes transmitting, to a base station (BS), a first random access preamble on a first uplink carrier selected from a plurality of uplink carriers, and transmitting, to the BS, a second random access preamble on a second uplink carrier selected from the plurality of uplink carriers when a random access response corresponding to the first random access preamble is not successfully received from the BS.

7 Claims, 10 Drawing Sheets

METHOD OF PERFORMING RANDOM ACCESS PROCEDURE IN MULTIPLE COMPONENT CARRIER SYSTEM

CROSS-REFERENCE TO RELATED APPLICATIONS

This application claims the benefit of priority of U.S. Provisional Application No. 61/256,878 filed on Oct. 30, 2009, which is incorporated by reference in their entirety herein.

BACKGROUND

1. Field of the Invention

The present invention is related to a wireless communication, more particularly to a method of performing a random access procedure in a multiple-component carrier system.

2. Related Art

In a common wireless communication system, although the bandwidth of uplink and the bandwidth of downlink are differently set up, only one carrier is taken into consideration. Even in 3rd Generation Partnership Project (3GPP) Long Term Evolution (LTE), the number of carriers constituting uplink and downlink is 1, and the bandwidth of uplink and the bandwidth of downlink bandwidth are in general symmetrical to each other on the basis of a single carrier. However, it is not easy to allocate a large frequency bandwidth except some regions in the world. Accordingly, in order to efficiently use small sliced bands, a carrier aggregation technique for producing the same effect as that a logically large band is used by binding a plurality of physically non-continuous bands in the frequency domain is being developed. The carrier aggregation technique includes, for example, a technique in which system bandwidth of 100 MHz is supported by using multiple component carriers.

A user equipment (UE) shall perform random access procedure to gain access to a network. The random access procedure is accomplished through a Random Access Channel (RACH), i.e., an uplink transmission channel. The UE transmits an initial control message (i.e. preamble) to the network through the RACH. The aim of performing the random access procedure is to obtain time synchronization between the UE and the network or to obtain radio resources for uplink transmission.

When radio resource control (RRC) layer of the UE receives a random access problem such as a random access failure, the UE considers radio link failure to be detected and so initiates the connection re-establishment procedure in which case the UE sends the RRC connection re-establishment request message to a base station (BS) in order to recover the connection to the network.

Because multiple uplink component carriers (CCs) can be aggregated, the UE can perform a random access procedure on one uplink CC or on another CC, even possibly on both CCs.

When a random access response corresponding to a random access preamble is not received by the UE or contention resolution is not successful, a random access problem occurs. Accordingly, a method of effectively handling this random access problem in multiple-component carrier system is required.

SUMMARY

The present invention provides a method of performing a random access procedure in a multiple-component carrier system.

According to an aspect of the present invention, a method of performing a random access procedure by a user equipment (UE) in a multiple-carrier system is provided. The method includes transmitting, to a base station (BS), a first random access preamble on a first uplink carrier selected from a plurality of uplink carriers, and transmitting, to the BS, a second random access preamble on a second uplink carrier selected from the plurality of uplink carriers when a random access response corresponding to the first random access preamble is not successfully received from the BS. The first uplink carrier and the second uplink carrier are aggregated.

According to another aspect of the present invention, method of performing a random access procedure by a base station (BS) in a multiple-carrier system is provided. The method includes receiving, from a user equipment (UE), a first random access preamble on a first uplink carrier selected from a plurality of uplink carriers, and receiving, from the UE, a second random access preamble on a second uplink carrier selected from the plurality of uplink carriers when a random access response corresponding to the first random access preamble is not successfully transmitted to the UE. The first uplink carrier and the second uplink carrier are aggregated.

DESCRIPTION OF EXEMPLARY EMBODIMENTS

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

Further, in this specification, a wireless communication network is chiefly described. However, tasks performed in the wireless communication network can be performed in a process of a network managing system (e.g., a base station), such as controlling the wireless communication network and sending data, or can be performed in a mobile station coupled to the corresponding wireless communication network.

Figure 1:
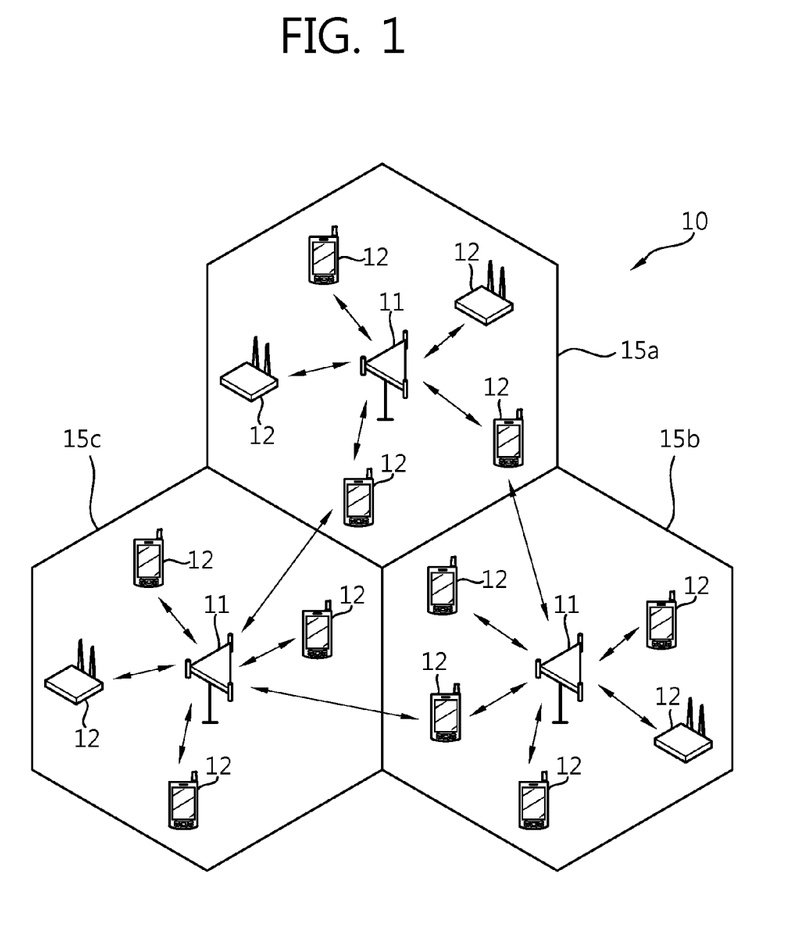
FIG. 1 is a diagram showing a wireless communication system.

FIG. 1 is a diagram showing a wireless communication system.

Referring to FIG. 1, a wireless communication system 10 is broadly deployed to provide various communication services such as voice, packet data.

The wireless communication system 10 includes at least one Base Station (hereinafter referred to as 'BS') 11. The BSs 11 provide communication services to respective geographical areas (in general, called 'cells') 15a, 15b, and 15c. The cell can be divided into a plurality of areas (called 'sectors').

A user equipment (hereinafter referred to as a 'UE') 12 can be fixed and mobile and also referred to as another terminology, such as a mobile station (MS), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station which communicates with the MSs 12, and it can be referred to as another terminology, such as an evolved-NodeB (eNB), a Base Transceiver System (BTS), or an access point (AP). The cell should be comprehensively interpreted to indicate some frequencies provided by the BS 11. The cell includes a variety of coverage areas, such as a mega cell, a macro cell, a micro cell, a pico cell, and a femto cell.

Hereinafter, downlink refers to communication from the BS 11 to the UE 12, and uplink refers to communication from the UE 12 to the BS 11. In the downlink, a transmitter can be part of the BS 11 and a receiver can be part of the UE 12. In the uplink, a transmitter can be part of the UE 12 and a receiver can be part of the BS 11.

There are no limits to multiple access schemes to which a wireless communication system is applied. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, can be used. A Time Division Duplex (TDD) method of performing uplink transmission and downlink transmission at different times or a Frequency Division Duplex (FDD) method of performing uplink transmission and downlink transmission using different frequencies can be used.

The layers of a radio interface protocol between A UE and a network can be classified into L1 (i.e., a first layer), L2 (i.e., a second layer), and L3 (i.e., a third layer) based on the three lower layers of an Open System Interconnection (OSI) reference model which is widely known in the communication system.

The physical layer belonging to the first layer provides information transfer service to a higher layer using the physical channel. The physical layer is connected to a Medium Access Control (hereinafter referred to as 'MAC') layer through a transport channel which is placed in a higher layer. Information is moved between the medium access control layer and the physical layer through the transport channel. Further, Information is moved between different physical layers (i.e., the physical layers on the transmission side and the reception side) through the physical channel. The physical channel is modulated using an OFDM (Orthogonal Frequency Division Multiplexing) method, and it uses the time and frequency as radio resources.

The MAC layer of the second layer provides service layer through a logical channel to a Radio Link Control (hereinafter referred to as 'RLC') layer which is higher than the MAC layer. The RLC layer of the second layer supports reliable data transmission. The function of the RLC layer may be implemented using a function block within the MAC layer. In such a case, the RLC layer may not exist. The PDCP layer of the second layer performs header compression function for reducing the size of an IP packet header including relatively large and unnecessary control information so that an IP packet, such as IPv4 or IPv6, can be efficiently sent in a radio range having a small bandwidth.

A Radio Resource Control (hereinafter referred to as 'RRC') layer is related to the configuration, re-configuration, and release of a Radio Bearer (hereinafter referred to as a 'RB') and is responsible for the control of logical channels, transport channels, and physical channels. Here, the RB refers to service provided by the second layer for data transfer between a UE and an UTRAN. In the case in which RRC connection exists between the RRC of a UE and the RRC layer of a wireless network, the UE is in the RRC connected mode. In the case in which RRC connection does not exist between the RRC of A UE and the RRC layer of a wireless network, the UE is in the RRC idle mode. A Non-Access Stratum (NAS) layer placed over the RRC layer performs functions, such as session management and mobility management.

Carrier Aggregation (CA) is a type of radio configuration which provides aggregation of two or more component carriers in order to support wider transmission bandwidths up to 100 MHz. CA is also called a spectrum aggregation or a bandwidth aggregation. An individual unit carrier bound by CA is referred to as a Component Carrier (hereinafter referred to as a 'CC'). Each CC is defined by a bandwidth and a center frequency. The CA is used to support an increasing throughput, prevent an increase of the costs resulting from the introduction of broadband RF (radio frequency) devices, and guarantee compatibility with the existing system.

For example, assuming that 5 CCs are allocated as the granularity of a carrier unit having a bandwidth of 5 MHz, a maximum of a bandwidth of 20 MHz can be supported.

Figure 2:
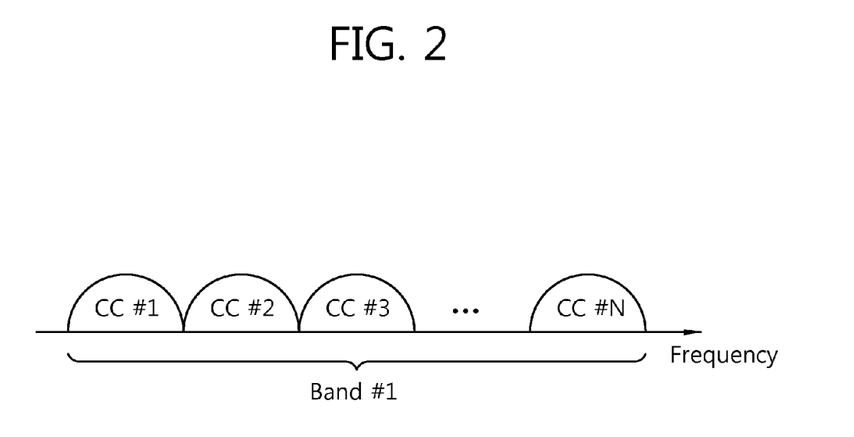
FIG. 2 is an example of the intra-band contiguous carrier aggregation
Figure 3:
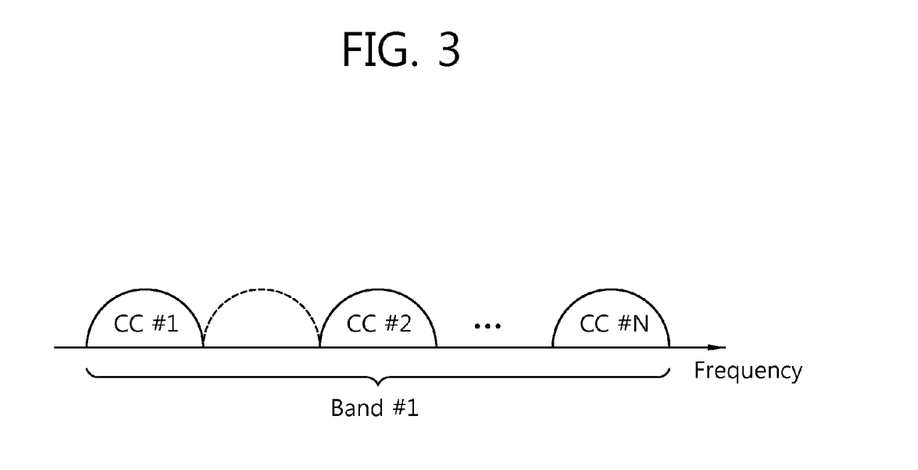
FIG. 3 is an example of the intra-band non-contiguous carrier aggregation
Figure 4:
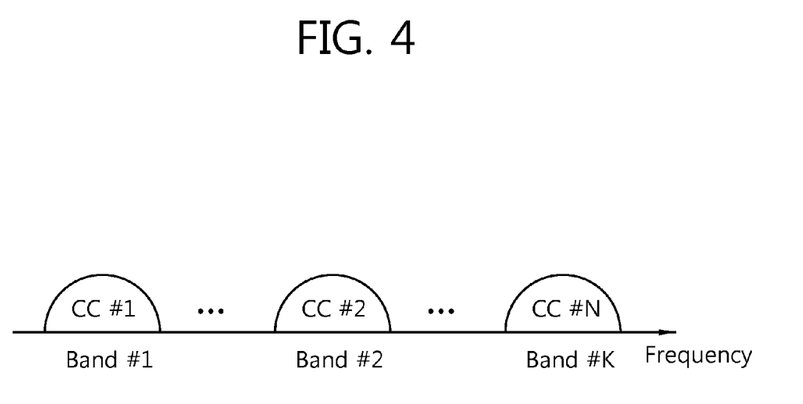
FIG. 4 is an example of the inter-band carrier aggregation.

The carrier aggregation can include the intra-band contiguous carrier aggregation such as that shown in FIG. 2, the intra-band non-contiguous carrier aggregation such as that shown in FIG. 3, and the inter-band carrier aggregation such as that shown in FIG. 4.

Referring first to FIG. 2, the intra-band contiguous carrier aggregation is performed between CCs consecutive to each other in the intra-band. For example, all CC#1, CC#2, CC#3, . . . , CC n (i.e., aggregated CCs) are consecutive to each other.

Referring to FIG. 3, the intra-band non-contiguous carrier aggregation is performed between discontinuous CCs. For example, CC#1 and CC#2 (i.e., aggregated CCs) are spaced apart from each other with a specific frequency interposed therebetween.

Referring to FIG. 4, in the inter-band carrier aggregation, one or more of a plurality of CCs are aggregated on another frequency band. For example, a CC #1 (i.e., an aggregated CC) can exist in a band #1 and a CC #2 can exist in a band #2.

The number of aggregated downlink CCs and the number of aggregated uplink CCs can be differently configured. A case in which the number of downlink CCs is identical to the number of uplink CCs is called a symmetric aggregation, and a case in which the number of downlink CCs is different from the number of uplink CCs is called an asymmetrical aggregation.

Further, CCs can have different sizes (i.e., bandwidths). For example, assuming that 5 CCs are used to construct a 70 MHz band, the construction can include, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple carrier system refers to a system supporting the carrier aggregation. In the multiple carrier system, a contiguous carrier aggregation or a non-contiguous carrier aggregation or both can be used. Further, either a symmetrical aggregation or an asymmetrical aggregation can be used.

Figure 5:
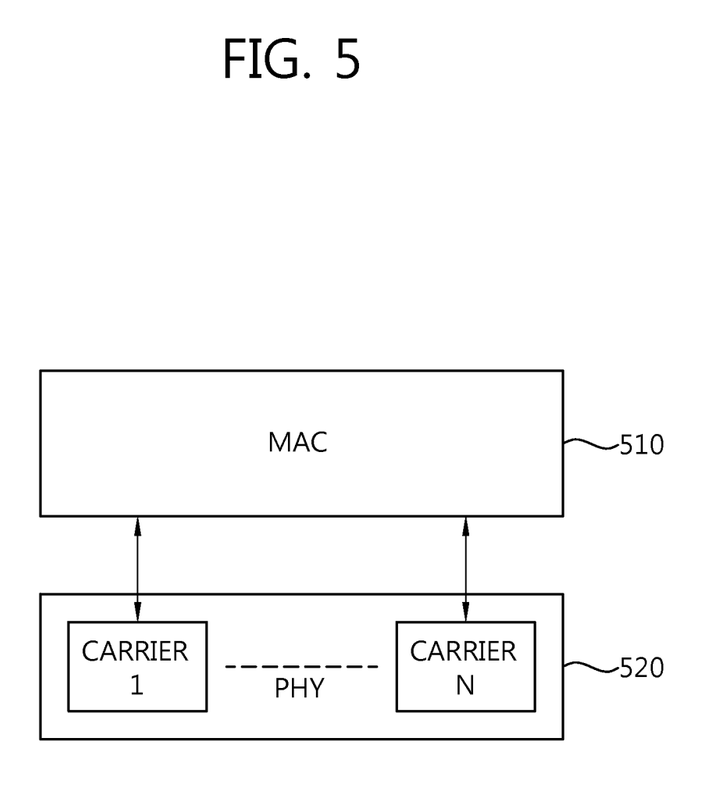
FIG. 5 is a diagram showing an example of a protocol structure for supporting multiple CCs.

FIG. 5 is a diagram showing an example of a protocol structure for supporting multiple CCs.

Referring to FIG. 5, a common MAC entity 510 manages a physical layer 520 which uses a plurality of CCs. A MAC management message transmitted through a specific CC can be applied to other CCs. That is, the MAC management message can control other CCs including the specific CCs. The physical layer 520 can be operated according to a TDD or a FDD or both.

Several physical control channels are used in the physical layer 520. A Physical Downlink Control Channel (PDCCH) used to transmit physical control information informs a UE of the resource allocation of a PCH (paging channel) and a downlink shared channel (DL-SCH) and Hybrid Automatic Repeat Request (HARQ) information related to the DL-SCH. The PDCCH also carries an uplink grant informing a UE of the allocation of resources, MCS level and uplink power control information, etc. for uplink transmission.

A Physical Control Format Indicator Channel (PCFICH) is used to inform a UE of the number of OFDM symbols used in PDCCHs and transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information such as a Channel Quality Indicator (CQI). A Physical Uplink Shared Channel (PUSCH) carries an UL-SCH (uplink shared channel).

Figure 6:
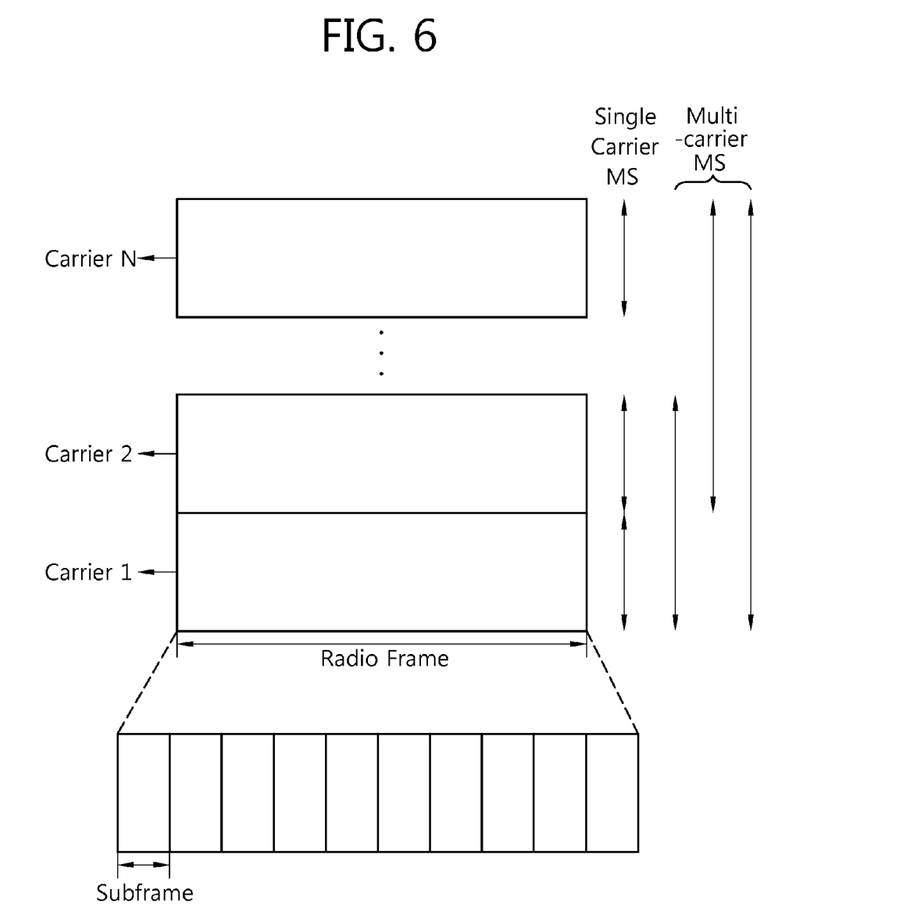
FIG. 6 is a diagram showing an example of a frame structure for a multiple component carrier operation.

FIG. 6 is a diagram showing an example of a frame structure for a multiple component carrier operation.

Referring to FIG. 6, a radio frame consists of 10 subframes. Each of the subframes includes a plurality of OFDM symbols. Each CC can have its own control channel (e.g., a PDCCH). The CCs may be contiguous to each other or may not be contiguous to each other. A UE can support one or more CCs according to its capability.

CCs can be classified into a Primary Component Carrier (hereinafter referred to as a 'PCC') and a Secondary Component Carrier (hereinafter referred to as an 'SCC') whether it is activated. The PCC is always activated, and the SCC is activated or deactivated according to specific conditions.

The term 'activation' means that traffic data are being transmitted or received or are in a ready state. The term 'deactivation' means that the transmission or reception of traffic data is impossible, but measurement or the transmission or reception of minimum information is possible.

A UE can use only one PCC or can use one or more SCCs together with the PCC. A PCC or a SCC or both can be allocated to a UE by a BS. The PCC can be used for a UE to enter a network or used to allocate an SCC or both. A carrier set to an SCC can also be changed to a PCC.

Figure 7:
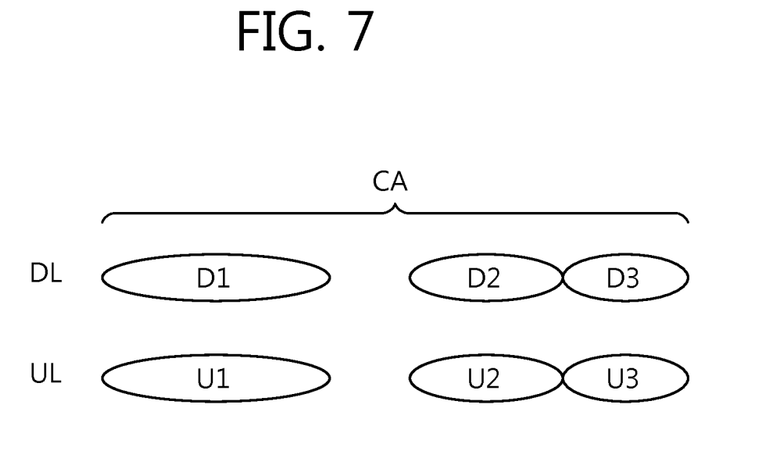
FIG. 7 is a diagram showing a linkage between a downlink component carrier and an uplink component carrier in a multiple carrier system.

FIG. 7 is a diagram showing a linkage between a downlink component carrier and an uplink component carrier in a multiple carrier system.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is an index of a DL CC, and Ui is an index of an UL CC (where i=1, 2, 3). At least one DL CC is a PCC, and the remaining DL CCs are SCCs. Likewise, at least one UL CC is a PCC and the remaining UL CCs are SCCs. For example, D1 and U1 can be PCCs, and D2, U2, D3, and U3 can be SCCs.

In an FDD system, a DL CC and an UL CC are linked to each other in a one-to-one manner. D1 is linked to U1, D2 is linked to U2, and D3 is linked to U3 in a one-to-one manner. A UE links DL CCs and an UL CC through system information transmitted by a logical channel BCCH or an RRC message dedicated for a UE, transmitted by a DCCH. Each link may be set up in a cell-specific manner or a UE-specific manner.

In a multiple component carrier system, each idle UE can select a specific CC or cell through which radio connection between the each idle UE and a BS will be configured. For example, in the case in which radio connection to a UE is configured through a cell 2 of CC1, it may be said that the radio connection is configured through the CC1 or configured through the cell 2. Hereinafter, it is assumed that radio connection is configured in the CC dimension for consistency of description.

A UE performs random access procedure to obtain time synchronization with a network or to obtain radio resources for transmitting uplink data. Random access procedure is performed by a MAC layer.

For example, a UE is going to initially access to a cell after power is turned on. To access the cell, the UE needs to obtain time synchronization for a downlink channel in order to receive system information of the cell. After receiving the system information, the UE can transmits a connection request message for an RRC connection. To obtain time synchronization, the UE has to perform random access procedure. Using the random access procedure, the UE can request radio resources for transmitting the connection request message to the cell. A base station that has received the radio resource request allocates appropriate radio resources to the UE so that the UE can transmit the connection request message.

For another example, it is assumed that a UE has an RRC connection with a base station. The base station schedules allocation of radio resource for the UE. When there are no more uplink data, the buffer of the UE is empty and the base station does not allocate uplink radio resources. It is inefficient to allocate uplink radio resources to the UE that does not use the uplink radio resources. The buffer status of the UE is reported to the network periodically or non-periodically. When new data is arrived in the buffer of the UE, the UE needs to perform random access procedure in order to obtain uplink radio resources. Using the random access procedure the UE requests radio resources to the base station.

Figure 8:
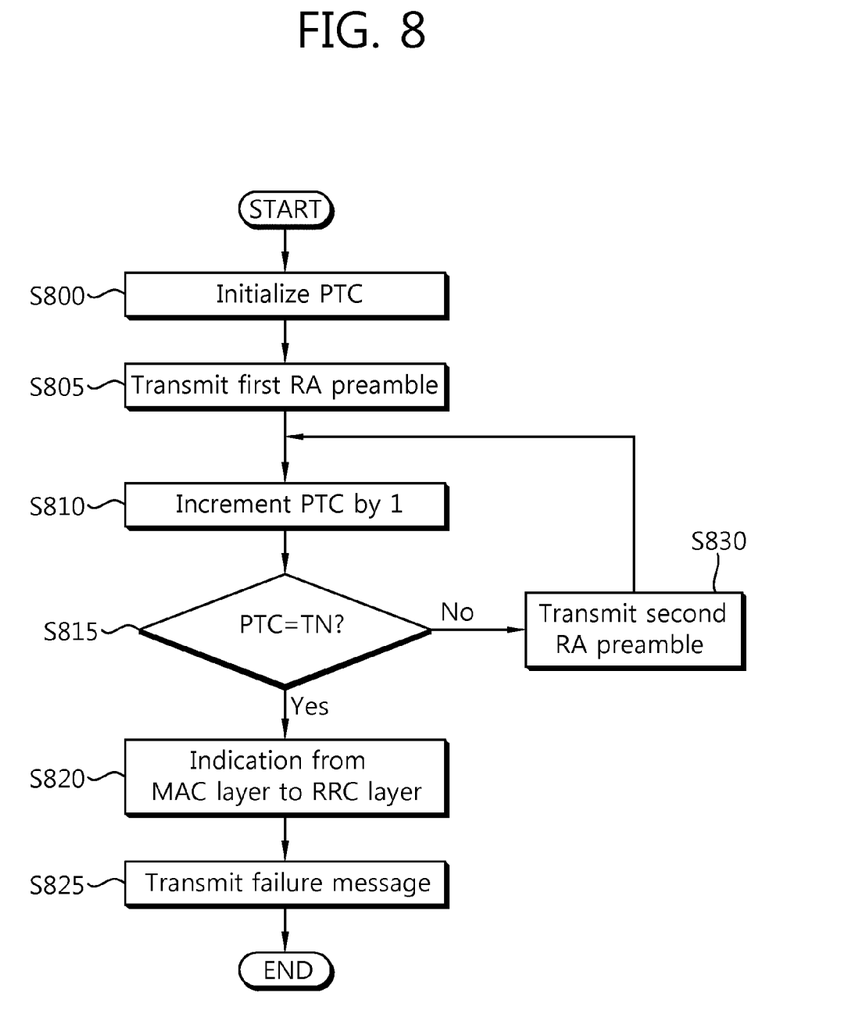
FIG. 8 is a flow chart illustrating a random access procedure by a UE in a multiple-component carrier system according to an embodiment of the present invention.

FIG. 8 is a flow chart illustrating a random access procedure by a UE in a multiple-component carrier system according to an embodiment of the present invention. This illustrates how to handle a radio link failure due to random access failures. So it is assumed that random access procedures are not successful in every attempt.

Referring to FIG. 8, a UE shall initialize a preamble transmission counter (PTC) by setting it to an initial value such as 1 at random access procedure initialization S800. The initialization is performed in a medium access control (MAC) layer of the UE.

In a random access procedure of the present invention, a UE maintains a PTC. The PTC is an accumulative number of transmission and retransmissions of a random access (RA) preamble.

The UE transmits a first random access (RA) preamble to a base station (BS) on a first uplink CC selected from aggregated uplink CCs for the UE S805.

The UE counts the number of preamble transmissions. For example, the UE increments the PTC by 1 S810. The UE increases the PTC by 1 every transmission and retransmission of a RA preamble. The retransmission of a RA preamble takes place when a random access response corresponding to the UE is not received by the UE. The retransmission of a RA preamble also takes place when contention resolution is not successful.

The UE checks or monitors if the PTC reaches a predefined threshold number (TN) S815. The TN equals to preamble-TransMax (TMAX)+1. The TMAX is the maximum number of transmission and retransmissions of a RA preamble allowed for the UE. The TN is predefined by an RRC layer of the UE. The RRC layer notifies the predefined TN to the MAC layer of the UE. When the PTC equals to the TN, it is regarded that more retransmissions of a RA preamble are not desirable and a failure message is necessary.

If the PTC reaches the predefined TN, the MAC layer informs the RRC layer of the RA problem by an indication S820. The indication indicates that the PTC reaches a TN. And the RRC layer of the UE transmits a failure message to the BS S825. In an embodiment, the failure message is a RRC connection re-establishment request message used for RRC connection re-establishment procedure. to recover the connection to the BS. In another embodiment, the failure message is a CC failure message.

If the PTC is smaller than the predefined TN, and if the UE determines that the first RA preamble transmission was unsuccessful, the UE transmits a second RA preamble to the BS on a second uplink CC selected from the aggregated uplink CCs for the UE S830.

The RA procedure of a UE illustrated above clarifies how to detect a failure among aggregated uplink CCs in RA procedure and how to handle the failure.

With regard to the step S810 where the preamble retransmission, there are some cases where the preamble retransmission is performed in a random access procedure.

i) No random access response is received within the RA Response window, or none of all received Random Access Responses contains a Random Access Preamble identifier (RAPID) corresponding to the transmitted random access preamble. The random access response reception is considered not successful and the UE shall increment the PTC by 1 after retransmitting a RA preamble.

ii) The random access response reception is considered successful and so UE sends Msg 3 including either C-RNTI MAC control element or CCCH SDU. If UE does not receive its C-RNTI on PDCCH or if the UE contention resolution identity included in the MAC control element does not match the CCCH SDU that the UE transmits in Msg3, the UE considers contention resolution unsuccessful and the UE shall increment the PTC by 1 after retransmitting a RA preamble.

With regard to the step S810 where the PTC resets, there are some cases that are considered successful in random access procedure.

i) The random access response reception is considered successful and so UE sends Msg 3 including either C-RNTI MAC control element or CCCH SDU. If the random access procedure was initiated by the MAC sublayer itself and the PDCCH transmission is addressed to the C-RNTI and contains an UL grant for a new transmission, or if the random access procedure was initiated by a PDCCH order and the PDCCH transmission is addressed to the C-RNTI, the UE considers this Contention Resolution successful.

ii) In case that the CCCH SDU was included in Msg3 and the PDCCH transmission is addressed to its Temporary C-RNTI, if the UE Contention Resolution Identity included in the MAC control element matches the CCCH SDU transmitted in Msg3, the UE considers this Contention Resolution successful.

There are two types of a PTC.

1. Type 1 PTC

In an embodiment, a PTC is dedicated to only one CC. This is a type 1 PTC. According to type 1 PTC, a UE maintains one PTC per uplink CC which is configured for random access from the UE.

Figure 9:
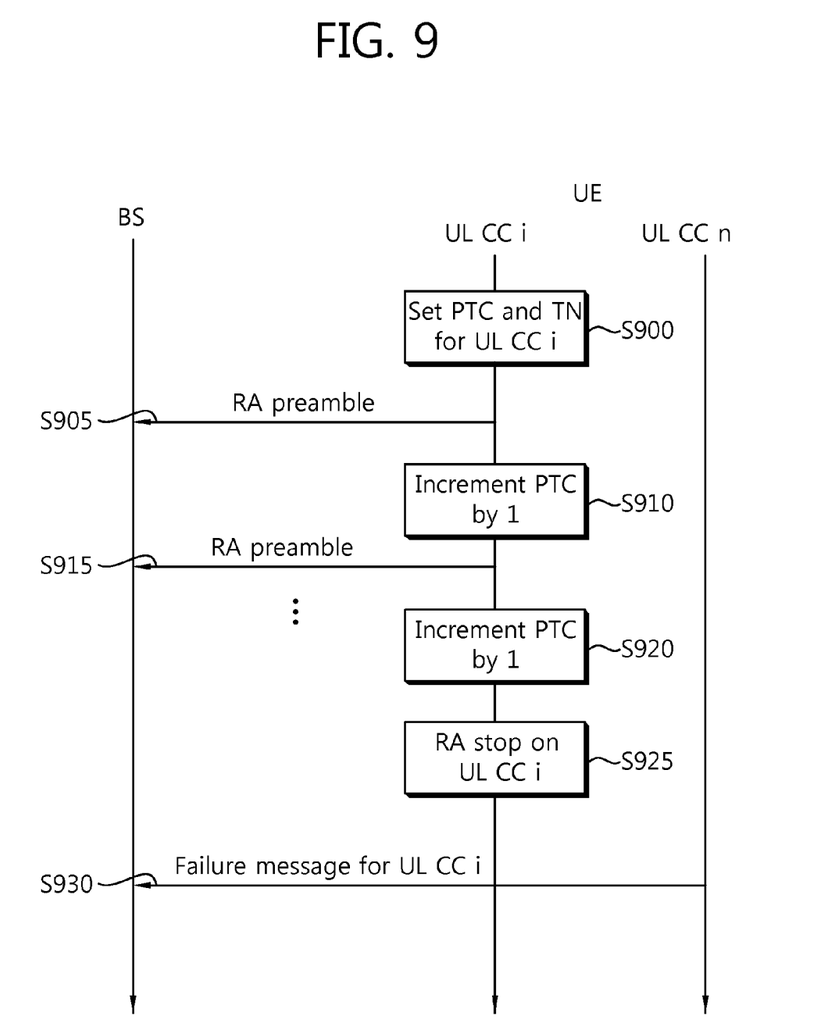
FIG. 9 is a flow chart illustrating a random access procedure between a UE and a BS in a multiple-component carrier system according to an embodiment of the present invention.

FIG. 9 is a flow chart illustrating a random access procedure between a UE and a BS in a multiple-component carrier system according to an embodiment of the present invention. This is the case to which type 1 PTC is applied.

Referring to FIG. 9, aggregated uplink carriers a UL CCi and a UL CCn are configured for a UE. The UE sets a PTC (TC) for the UL CCi and a predefined threshold number (TN) S900. More specifically, the setting of the TC and the TN is performed by a MAC layer of the UE. The MAC layer of the UE receives the TC and the TN for the UL CCi from a RRC layer of the UE. And the MAC layer of the UE initializes the TC for the UL CCi by setting it to 1.

The UE transmits a RA preamble to the BS on the UL CCi S905. The transmission of the RA preamble is performed by the MAC layer of the UE.

The UE counts the number of preamble transmissions. For example, the UE increases the TC by 1 S910.

The UE retransmits a RA preamble to the BS on the UL CCi until this RA procedure is successfully completed or the number of RA preamble retransmissions on the UL CCi reaches the predefined TN S915.

FIG. 9 illustrates as if the UE increases the TC every time a preamble is transmitted. But it is for exemplary purpose only, so the UE can also increase the TC arbitrarily i.e. the UE increases the TC by 2 after 2 consecutive transmissions of the preamble. Or the UE counts the total number of preamble transmissions by now until a certain time.

The UE compares the TN with the current TC, and if the TN and the current TC are the same, the MAC layer of the UE indicates a UL CC failure of the UL CCi to the RRC layer of the UE S920.

The UE stops the RA procedure on UL CCi S925.

And after the RRA layer of the UE receives UL CC failure for CCi from the MAC layer of the UE, the RRC layer of the UE sends a failure message for UL CCi to the BS on another UL CC e.g. UL CCn by using RACH or UL SCH S930.

Additional steps are also available in this RA procedure after stopping the RA procedure on UL CCi. For example, the UE may move to another UL CCn and then starts to transmit a RA preamble on the UL CCn. The MAC layer of the UE receives a new TC for UL CCn from the RRC layer. The MAC layer sets the new TC to 1 for UL CCn. Whenever MAC layer transmits a RA preamble on CCn, the MAC layer increases the new TC for UL CCn.

So The UE checks the RA failure for each UL CC which is configured for RA from the UE. If all of the UL CCs that are configured for RA from the UE have the UL CC failure as described above, either the MAC layer of the UE indicates a random access problem to the RRC layer, or the RRC layer considers that radio link failure (RLF) occurs without any indication of the random access problem from the MAC layer. Either way, as a result, the RRC layer initiates the connection re-establishment procedure.

In one embodiment, the failure message in step S930 can be a RRC connection re-establishment request message used for RRC connection re-establishment procedure. In another embodiment, the RRC layer of the UE can wait until it finally receives UL CC failure from all of the UL CCs that are configured for RA in the UE. Then, if all of the UL CCs that are configured for RA in the UE finally have the UL CC failure, the RRC layer of the UE RRC initiates the connection re-establishment procedure by sending the RRC connection re-establishment request message to the BS.

Next, with regard to type of the preamble, if the UE has performed the RA procedure for UL CCi with a dedicated preamble that is available only for the UL CCi, the UE retries the RA procedure on the UL CCn with non-dedicated preamble. On the contrary, if the UE has performed RA procedure on UL CCi with a dedicated preamble that is available for multiple CCs, the UE retries the RA procedure on the UL CCn with the dedicated preamble until a timer for the dedicated preamble is expired.

In this way, the UE can maintain a type 1 PTC per UL CC which is configured for RA procedure from the UE. The UE is configured with predefined TN per UL CC which is configured for RA procedure from the UE.

2. Type 2 PTC

In another embodiment, a PTC is common to all configured uplink CC for a UE. This is a type 2 PTC. According to type 2 PTC, a UE maintains one PTC applied to all of the configured CC for the UE.

Figure 10:
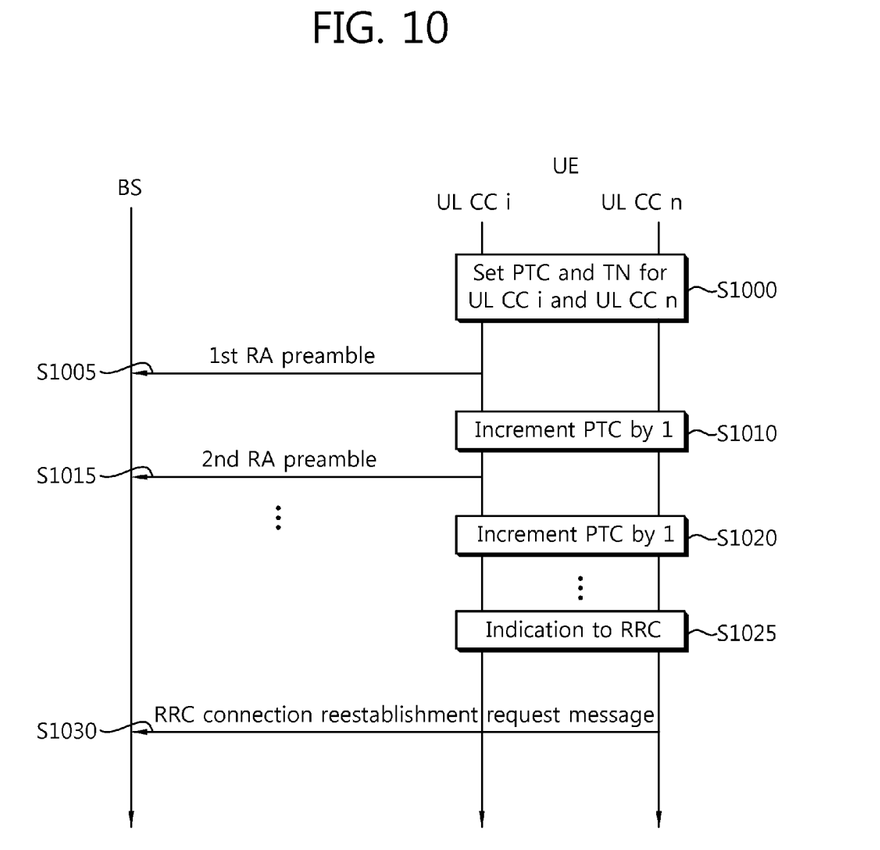
FIG. 10 is a flow chart illustrating a random access procedure between a UE and a BS in a multiple-component carrier system according to another embodiment of the present invention.

FIG. 10 is a flow chart illustrating a random access procedure between a UE and a BS in a multiple-component carrier system according to another embodiment of the present invention. This is the case to which type 2 PTC is applied.

Referring to FIG. 10, aggregated uplink carriers a UL CCi and a UL CCn are configured for a UE. The UE sets a PTC (TC) and a predefined threshold number (TN) which are common to both the UL CCi and the UL CCn S900. The MAC layer of the UE initializes the TC by setting it to 1.

The UE transmits a first RA preamble to the BS on any configured UL CC i.e. a UL CCi S1005. The UE counts the number of preamble transmissions. For example, the UE increments the TC by 1, if the transmission of the first RA preamble has been unsuccessful S1010. The UE a second RA preamble to the BS on any configured UL CC i.e. a UL CCn S1015. The UE increments the TC by 1 again S1020. In this manner, regardless of which UL CC is used for RA preamble transmission and retransmission, the UE increases the TC by 1 for all UL CCs that are configured for the UE.

Whenever RA response corresponding to the preamble is not received or contention resolution is not successful, the UE may retry at least one of the step S1005 to S1020 until this RA procedure is successfully completed or the number of preamble transmissions for all configured UL CCs reaches the predefined TN.

And if the TC reaches the predefined TN, the RRC layer of the UE indicates a RA problem to the RRC layer of the UE S1025.

When the RRC layer of the UE receives the RA problem from the MAC layer, the RRC layer performs the RRC connection re-establishment procedure by sending the RRC connection re-establishment request message to the BS S1030.

FIG. 10 illustrates as if the UE increases the TC every time a preamble is transmitted. But it is for exemplary purpose only, so the UE can also increase the TC arbitrarily i.e. the UE increases the TC by 2 after 2 consecutive transmissions of the preamble. Or the UE counts the total number of preamble transmissions by now until a certain time.

Although FIG. 9 and FIG. 10 suggest a usage of only two UL CCs in a RA procedure, it is for an exemplary purpose. So the technical spirit of the present invention is applied to a usage of more than two UL CCs.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of performing a random access procedure by a user equipment (UE) in a multiple-carrier system, the method comprising:

setting, by the UE, a common counter and a predetermined threshold for all configured uplink carriers, the common counter being used to count a number of preamble transmissions on all of the configured uplink carriers, the predetermined threshold being a maximum number of preamble transmissions or preamble retransmissions allowed for the UE, the setting of the common counter and the predetermined threshold being performed by a Medium Access Control (MAC) layer of the UE;

transmitting, to a base station (BS), a first random access preamble on a first uplink carrier selected from all of the configured uplink carriers;

transmitting, to the BS, a second random access preamble on a second uplink carrier selected from all of the configured uplink carriers when the first random access preamble is not successful to receive a corresponding random access response;

counting, by the UE, a number of preamble transmissions on the first uplink carrier and the second uplink carrier, the common counter being incremented each time that both the first uplink carrier and the second uplink carrier transmit the first and second random access preamble;

determining, by the UE, whether the number of preamble transmissions reaches the predetermined threshold; and indicating a random access problem to an upper layer if it is determined that the number of preamble transmissions reaches the predetermined threshold, wherein the indicating operation is performed by only considering the determining operation, wherein the random access problem is indicated to a Radio Resource Control (RRC) layer of the UE, and wherein the first uplink carrier and the second uplink carrier are aggregated.

2. The method of claim 1, further comprising transmitting a failure message from the upper layer to the BS.

3. The method of claim 2, wherein the upper layer is a radio link control (RRC) layer and the failure message is a RRC connection reestablishment request message.

4. The method of claim 1, wherein the predetermined threshold is common for the first uplink carrier and the second uplink carrier.

5. A method of performing a random access procedure by a base station (BS) in a multiple-carrier system, the method comprising:

receiving, from a user equipment (UE), a first random access preamble on a first uplink carrier selected from all of the configured uplink carriers;

receiving, from the UE, a second random access preamble on a second uplink carrier selected from all of the configured uplink carriers when the first random access preamble is not successful to receive a corresponding random access response by the UE; and receiving a failure message from the UE, the failure message indicating a random access problem, wherein a common counter and a predetermined threshold for all of the configured uplink carriers are set by the UE, wherein the common counter is used to count a number of preamble transmission on all of the configured uplink carriers, wherein the predetermined threshold is a maximum number of preamble transmissions or preamble retransmissions allowed for the UE, wherein the setting of the common counter and the predetermined threshold are performed by a Medium Access Control (MAC) layer of the UE, wherein a number of the preamble transmission on the first uplink carrier and the second uplink carrier is counted by the UE, wherein the common counter is incremented arbitrarily each time that the both first uplink carrier and second uplink carrier transmit the first and second random access preamble, wherein the UE determines whether the number of preamble transmissions reaches the predetermined threshold, wherein a random access problem is indicated to an upper layer if it is determined by the UE that the number of preamble transmissions reaches the predetermined threshold, wherein the indicating the random access problem to the upper layer is performed by only considering the determination by the UE, wherein the random access problem is indicated to a Radio Resource Control (RRC) layer of the UE, and wherein the first uplink carrier and the second uplink carrier are aggregated.

6. The method of claim 5, wherein the failure message is a RRC (Radio Resource Control) connection reestablishment request message.

7. The method of claim 5, wherein the threshold is common for the first uplink carrier and the second uplink carrier.

\* \* \* \* \*